United States Patent [19]

Ohshita

[11] Patent Number: 4,900,141
[45] Date of Patent: Feb. 13, 1990

[54] REAR CONVERSION LENS
[75] Inventor: Koichi Ohshita, Kawasaki, Japan
[73] Assignee: Nikon Corporation, Tokyo, Japan
[21] Appl. No.: 328,490
[22] Filed: Mar. 24, 1989
[30] Foreign Application Priority Data Apr. 1, 1988 [JP] Japan ................................. 63-80376

[51] Int. Cl.⁴ ........................ G02B 15/10; G02B 9/60
[52] U.S. Cl. ..................................... 350/465; 350/422
[58] Field of Search ................................ 350/465, 422
[56] References Cited
U.S. PATENT DOCUMENTS 4,770,508  9/1988  Yamada et al. ..................... 350/422

Primary Examiner—Bruce Y. Arnold
Assistant Examiner—Rebecca D. Gass
Attorney, Agent, or Firm—Shapiro and Shapiro

[57] ABSTRACT

A rear conversion lens which is to be mounted between a main lens and a predetermined image plane for attaining a larger resultant focal distance than a focal distance of the main lens basically comprises, in the order taken from an object, a first lens unit having a positive refractive power and a second lens unit having a negative refractive power, and has a negative refractive power as a whole.

The structure meets the following conditional formulas.

$$0.5 < f_1/|f_{RCL}| < 0.6, \quad f_{RCL} < 0 \quad (1)$$

$$1.2 < r_2/r_3 < 1.4 \quad (2)$$

where $f_{RCL}$ is a focal distance of the rear conversion lens, $f_1$ is a focal distance of the first lens unit, $r_2$ is a radius of curvature of the first lens unit facing an image, and $r_3$ is a radius of curvature of the second lens unit facing an object.

8 Claims, 2 Drawing Sheets

REAR CONVERSION LENS

BACKGROUND OF THE INVENTION

1. Field of the Invention

The present invention relates to a rear conversion lens to be mounted in rear of a primary lens, and more particularly to a compact rear conversion lens which can be mounted in a compact camera or video camera.

2. Related Background Art

A conversion lens to be mounted in front of or in rear of a main lens in order to expand a focal distance of the main lens has been known.

A so-called front conversion lens which is mounted in front of the main lens can readily expand the focal distance of the main lens but it leads to an increased diameter of the front conversion lens. Accordingly, it is difficult to mount it in a compact camera.

On the other hand, a so-called rear conversion lens (RCL) which is mounted in rear of the main lens is basically of a structure which is advantageous to compactness.

As a result, many proposals have been made, for example by Japanese Laid-Open Patent Applications No. 60-214327, No. 60-179712 and No. 58-195817 and Japanese Patent Publication No. 61-45207.

Although many efforts have been done in those known techniques, they are still not enough in the following aspects.

In the Laid-Open Patent Application No. 60-214327, a magnification is as low as 1.2 and effect as the RCL is small.

In the Laid-Open Patent Application No. 60-179712, the magnification of the RCL is 1.5–2.0 but the compactness of the structure is not satisfactory because it uses three lenses, positive, negative and negative lenses.

On the other hand, in the Laid-Open Patent Application No. 58-195817, the RCL comprises two lenses, positive and negative lenses but a magnification is as low as 1.15. Thus, an effect as the RCL is small.

In the Patent Publication No. 61-45207, a magnification of 1.5 is attained with two lenses, positive and negative lens but a correction for an outer coma aberration which is caused by the RCL is insufficient and a satisfactory performance is hard to attain.

SUMMARY OF THE INVENTION

It is an object of the present invention to provide a high performance rear conversion lens (RCL) which solves all of the above problems, has a structure which permits a simple and compact shape, provide a high magnification and can be mounted in a compact camera.

In accordance with the present invention, the rear conversion lens which is to be mounted between a main lens and a predetermined image plane for attaining a larger resultant focal distance than a focal distance of the main lens basically comprise, in the order taken from an object, a first lens unit having a positive refractive power and a second lens unit having a negative refractive power, and has a negative refractive power as a whole.

The structure meets the following conditional formulas.

$$0.5 < f_1/|f_{RCL}| < 0.6, f_{RCL} < 0 \quad (1)$$

$$1.2 < r_2/r_3 < 1.4 \quad (2)$$

where $f_{RCL}$ is a focal distance of the rear conversion lens, $f_1$ is a focal distance of the first lens unit, $r_2$ is a radius of curvature of the first lens unit facing an image, and $r_3$ is a radius of curvature of the second lens unit facing an object.

The present invention provides a rear conversion lens which is light, simple and compact in structure, has a sufficient magnification, has an excellent imaging characteristic and can be removably mounted in a compact camera.

Other objects, features and advantages of the present invention will be apparent from the following description of the present invention when taken in conjunction with the accompanying drawings.

DETAILED DESCRIPTION OF THE PREFERRED EMBODIMENTS

Figure 1:
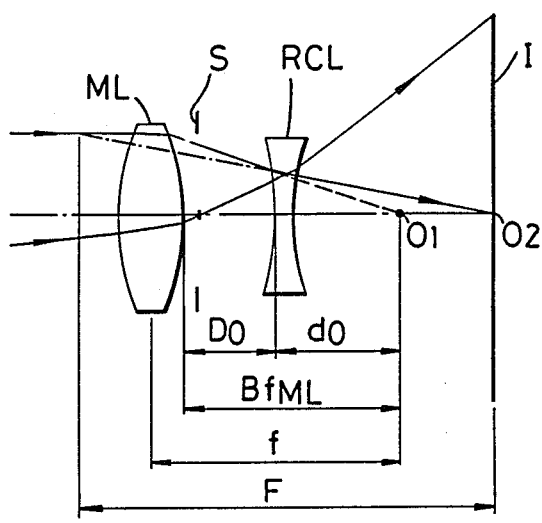
FIG. 1 illustrates a principle of an RCL in which a conversion lens is mounted in rear of a main lens.

The rear conversion lens (RCL) usually has a negative refractive power and it is mounted between a main lens ML which is operable by itself and has a focal distance f and a rear focal point $O_1$ of the main lens ML so that a light flux which passes through the main lens ML and is directed to the rear focal point $O_1$ is focused by the RCL at a resultant focal point $O_2$ on an image plane I which is in rear of the focal point $O_1$, as shown in FIG. 1. Thus, where the RCL is mounted in rear of the main lens ML, the resultant focal distance of the main lens ML and the RCL is expanded from f to F.

Figure 2:
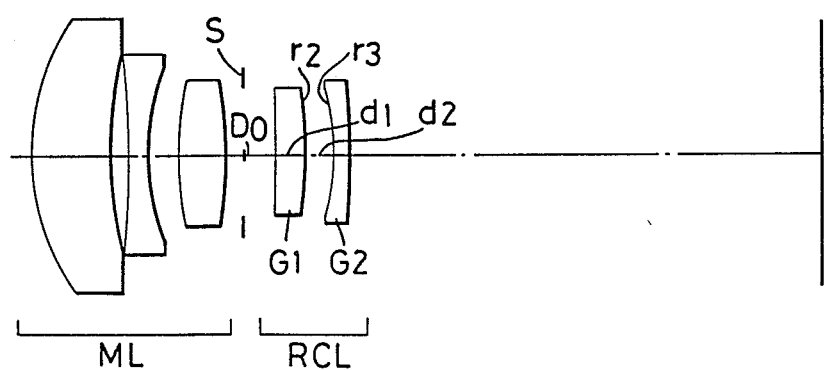
FIG. 2 shows a structure of an optical system in which an RCL in first, second or third embodiment of the present invention is mounted on a triplet type main lens shown in Table 1.
Figure 3:
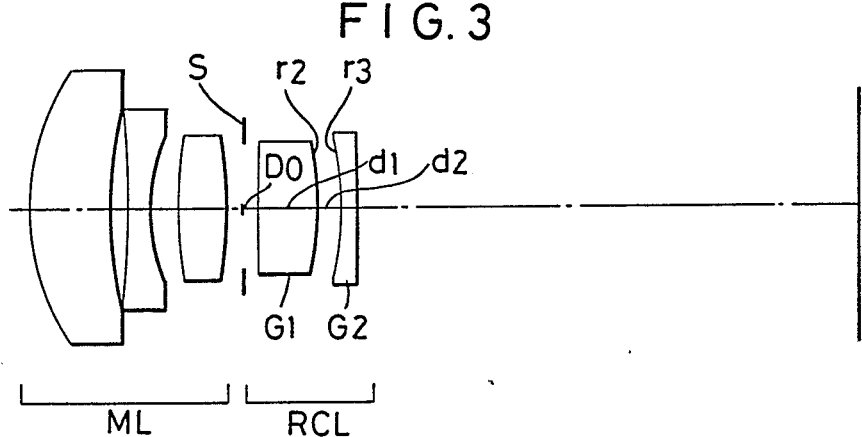
FIG. 3 shows a structure of an optical system in which an RCL of a fourth embodiment of the present invention is mounted on the triplet type main lens shown in Table 1.
Figure 4:
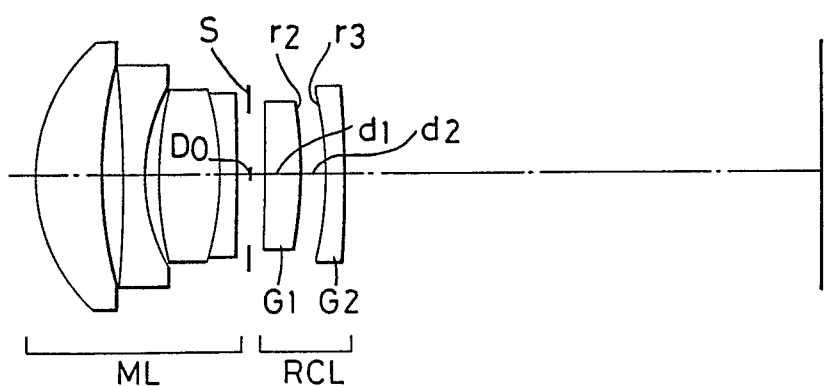
FIG. 4 shows a structure of an optical system in which an RCL of fifth or sixth embodiment of the present invention is mounted on a tessor type main lens shown in Table 6.

In an embodiment of the present invention, the RCL comprises, in the order taken from the object, a first lens unit $G_1$ having a positive refractive power and a second lens unit $G_2$ having a negative refractive power, as shown in FIGS. 2 to 4.

The RCL of the present invention meets the following conditional formulas $$0.5 < f_1/|f_{RCL}| < 0.6, f_{RCL} < 0 \quad (1)$$

$$1.2 < r_2/r_3 < 1.4 \quad (2)$$

where $f_{RCL}$ is a focal distance of the RCL, $f_1$ is a focal distance of the first lens unit $G_1$, $r_2$ is a radius of curvature of the first lens unit $G_1$ facing an image, and $r_3$ is a radius of curvature of the second lens unit $G_2$ facing an object.

In order to attain the expanded focal distance by mounting the RCL in rear of the main lens ML, the RCL must have a negative refractive power as a whole. In order to maintain a good imaging characteristic when the RCL is mounted on the main lens ML, the RCL must be properly corrected for aberration.

In general, however, when the RCL is mounted on the main lens ML which is properly corrected for aberration, a spherical aberration is overcorrected, a petzval sum becomes negative, a positive image curvature and a positive distortion aberration occur, and a coma aberration occurs at a periphery of the lens having the negative refractive power. In order to cancel those aberrations, the RCL must include at least one positive lens. In order to allow removable mounting of the RCL in a still camera or video camera, a compact structure is essential.

Thus, in order to construct the RCL as small number of lenses as possible and correct the aberration in the RCL, the RCL must comprise a lens unit having a positive refractive power and a lens unit having a negative refractive power. Thus, the RCL may be a combination of concave/convex lenses or convex/concave lenses.

In the former combination of the concave/convex lenses, an air lens formed between the negative lens unit and the positive lens unit affects to an off-axis light so that the correction for an off axis aberration over a wide angle is difficult to attain. Further, a diameter of the positive lens located in rear of the negative lens unit is increased by a dissipation action of the negative lens.

Accordingly, the RCL in the present invention basically comprises convex/concave lenses.

In order to adequately correct the aberration of the RCL with this structure, it is necessary to meet the above conditional formulas.

The conditional formulas of the present invention are now explained in detail.

The conditional formula (I) defines the proper focal distance of the first lens unit $G_1$ of the RCL. If the upper limit of the conditional formula (1) is exceeded, the petzval sum of the entire system including the main lens ML is a large negative value and a significant degradation is observed in a sadital image plane. On the other hand, when the lower limit is exceeded, the correction of an outer coma aberration generated in the RCL is difficult to attain.

The conditional formula (2) defines a proper ratio of the radius of curvature $r_2$ of the first lens unit $G_1$ facing an image and the radius of curvature $r_3$ of the second lens unit $G_2$ facing an object required to keep an optimum balance between the spherical aberration and a meridional image plane. If the upper limit of the conditional formula (2) is exceeded, the spherical aberration is over corrected and the balance to the negative meridional image plane is hard to keep. On the other hand, if the lower limit of the conditional formula (2) is exceeded, the spherical aberration is under-corrected and the balance to the negative meridional image plane is hard to keep.

In order to attain sufficient aberration correction and compactness, the following conditional formulas are to be preferably met.

$$0.70 < d_0/Bf_{ML} < 0.97 \qquad (3)$$

$$0.05 < D/|f_{RCL}| < 0.15 \qquad (4)$$

$$1.73 < n_2 \qquad (5)$$

$$0.018 < d_2/|f_{RCL}| < 0.028 \qquad (6)$$

$$0.025 < d_1/|f_{RCL}| < 0.065 \qquad (7)$$

$$12 < \nu_2 - \nu_1 < 20 \qquad (8)$$

where $Bf_{ML}$: back focus of the main lens ML $d_0$: distance from a plane of the rear conversion lens (RCL) facing the object to the rear focal point $O_1$ of the main lens ML $f_{RCL}$: focal distance of the rear conversion lens (RCL)

$D$: On-axis thickness of the rear conversion lens (RCL)

$n_2$: refractive index of the second lens unit $G_2$ $d_2$: On-axis distance between the plane of the first lens unit $G_1$ of the rear conversion lens (RCL) facing the image and the plane of the second lens unit $G_2$ facing the object $d_1$: On-axis thickness of the first lens unit $G_1$ $\nu_1$: Abbe number of the first lens unit $G_1$ $\nu_2$: Abbe number of the second lens unit $G_2$ The conditional formula (3) defines the mount position of the RCL relative to the main lens ML. If the upper limit of the conditional formula (3) is exceeded, it is advantageous for compactness of the RCL but a sufficient air gap $D_o$ between the main lens ML and the RCL is not maintained and the RCL cannot be removed. On the other hand, if the lower limit of the conditional formula (3) is exceeded, the diameter of the RCL increases and it is difficult to keep a sufficiently high magnification.

The conditional formula (4) defines the on-axis thickness of the RCL required for the compactness of the RCL. If the upper limit of the conditional formula (4) is exceeded, the size of the RCL increases. On the other hand, if the lower limit of the conditional formula (4) is exceeded, the correction of the off-axis aberration is hard to attain. In order to better correct, $$1.75 < n_2 \qquad (5')$$

is preferably to be met.

The conditional formula (5) defines the refractive index of the second lens unit $G_2$ required to maintain a proper petzval sum of the entire system including the main lens ML. If the limit of the conditional formula (5) is exceeded, the correction of the petzval sum is difficult to attain.

The conditional formula (6) defines the on-axis distance $d_2$ between the plane of the first lens unit $G_1$ of the RCL facing the image and the plane of the second lens unit $G_2$ facing the object. If the upper limit of the conditional formula (6) is exceeded, the correction of the negative image curvature is difficult to attain. On the other hand, if the lower limit of the conditional formula (6) is exceeded, the correction of the positive image curvature is difficult to attain. In order to attain better correction, $$0.027 < d_1/|f_{RCL}| < 0.050 \qquad (6')$$

is preferably to be met.

The conditional formula (7) defines the on-axis thickness $d_1$ of the first lens unit $G_1$ of the RCL required to properly correct a chrominance aberration. If the limit of the conditional formula (7) is exceeded, it is difficult to simultaneously correct the on-line chrominance aberration and magnification chrominance aberration. In order to attain better correction, $$12 < \nu_2 - \nu_1 < 18 \qquad (7')$$

is preferably to be met.

The conditional formula (8) defines a difference between the abbe number $\nu_1$ of the first lens unit $G_1$ and the abbe number $\nu_2$ of the second lens unit $G_2$ required to correct the on-axis chrominance aberration. If the upper limit of the conditional formula (8) is exceeded, the chrominance aberration is under corrected. On the other hand, if the lower limit is exceeded, the chrominance aberration is over-corrected.

Embodiments of the present invention are now explained. First to fourth embodiments of the RCL of the present invention shown in Tables 2 to 5 are designed for a triplet main lens ML shown in the Japanese Laid-Open Patent Application No. 60-177313 filed by the same assignee of the present invention, as shown in Table 1.

In those tables, $2\omega$ is an image angle, f is a focal distance of the main lens ML, $f_{RCL}$ is a focal distance of the RCL, $Bf_{ML}$ is a back focus of the main lens ML, F is a resultant focal distance of the main lens ML and the RCL, Bf is a back focus to the image plane, $D_o$ is an air gap between the last plane of the main lens ML and the first plane of the RCL, $d_o$ is a distance from the plane of the RCL facing the object to the rear focal point $O_1$ of the main lens ML, and $\beta$ is a magnification of the RCL.

TABLE 1

(main lens)
f = 36.00, F number 3.5, $2\omega$ = 63.2°

| No. | Radius of Curvature r | Center Thickness Distance d | Refractive Index n | Abbe Number $\nu$ |
|---|---|---|---|---|
| 1 | 13.070 | 5.100 | 1.79668 | 45.42 |
| 2 | 29.010 | 1.010 | | |
| 3 | −39.670 | 1.400 | 1.72825 | 28.34 |
| 4 | 13.740 | 1.800 | | |
| 5 | 35.000 | 2.900 | 1.80218 | 44.74 |
| 6 | −24.200 | ($Bf_{ML}$) | | |
| | $Bf_{ML}$ = 28.716 | | | |

A stop S (behind stop) is arranged at a position of 1.000 from the last plane of the main lens ML.

TABLE 2

(First embodiment)
F = 51.33, F number 5.0, $2\omega$ = 44.8°

| No. | Radius of Curvature r | Center Thickness Distance d | Refractive Index n | Abbe Number $\nu$ |
|---|---|---|---|---|
| 1 | −127.320 | 2.000 | 1.61750 | 30.75 |
| 2 | −20.600 | 1.500 | | |
| 3 | −16.380 | 1.000 | 1.79668 | 45.42 |
| 4 | −103.850 | (Bf) | | |

$D_o$ = 3.00, Bf = 31.25, $\beta$ = 1.426
$d_o$ = 25.716, $f_{RCL}$ = −69.93

TABLE 3

(Second embodiment)
F = 51.46, F number 5.0, $2\omega$ = 44.8°

| No. | Radius of Curvature r | Center Thickness Distance d | Refractive Index n | Abbe Number $\nu$ |
|---|---|---|---|---|
| 1 | −120.000 | 2.000 | 1.62588 | 35.64 |
| 2 | −21.000 | 1.500 | | |
| 3 | −16.500 | 1.000 | 1.77279 | 49.44 |
| 4 | −120.000 | (Bf) | | |

$D_o$ = 3.00, Bf = 31.35, $\beta$ = 1.429
$d_o$ = 25.716, $f_{RCL}$ = −69.93

TABLE 4

(Third embodiment)
F = 51.26, F number 5.0, $2\omega$ = 44.8°

| No. | Radius of Curvature r | Center Thickness Distance d | Refractive Index n | Abbe Number $\nu$ |
|---|---|---|---|---|
| 1 | −214.920 | 2.200 | 1.64831 | 33.77 |
| 2 | −22.450 | 1.500 | | |
| 3 | −17.030 | 1.000 | 1.77279 | 49.44 |
| 4 | −229.340 | (Bf) | | |

$D_o$ = 3.00, Bf = 30.87, $\beta$ = 1.424
$d_o$ = 25.716, $f_{RCL}$ = −68.83

TABLE 5

(Fourth embodiment)
F = 55.00, F number 5.3, $2\omega$ = 41.8°

| No. | Radius of Curvature r | Center Thickness Distance d | Refractive Index n | Abbe Number $\nu$ |
|---|---|---|---|---|
| 1 | 250.000 | 3.700 | 1.61750 | 30.75 |
| 2 | −23.000 | 1.500 | | |
| 3 | −17.500 | 1.000 | 1.84042 | 43.30 |
| 4 | 855.000 | (Bf) | | |

$D_o$ = 2.00, Bf = 32.59, $\beta$ = 1.528
$d_o$ = 26.716, $f_{RCL}$ = −57.38

Fifth and sixth embodiments of the RCL of the present invention shown in Tables 7 and 8 are designed for a tessor type main lens ML shown in the Japanese Laid-Open Patent Application No. 60-176011 filed by the assignee of the present invention.

In those tables, $2\omega$ is an image angle, f is a focal distance of the main lens ML, $f_{RCL}$ is a focal distance of the RCL, $Bf_{ML}$ is a back focus of the main lens ML, F is a resultant focal distance of the main lens ML and the RCL, Bf is a back focus to the image plane, $D_o$ is an air gap from the last plane of the main lens ML to the first plane of the RCL, $d_o$ is a distance from the plane of the RCL facing the object to the rear focal point $O_1$ of the main lens ML, and $\beta$ is a magnification of the RCL.

TABLE 6

(main lens)
f = 36.00, F number 3.0, $2\omega$ = 61.0°

| No. | Radius of Curvature r | Center Thickness Distance d | Refractive Index n | Abbe Number $\nu$ |
|---|---|---|---|---|
| 1 | 11.690 | 3.800 | 1.77279 | 49.44 |
| 2 | 25.640 | 1.280 | | |
| 3 | −57.950 | 1.440 | 1.71736 | 29.48 |
| 4 | 11.060 | 0.920 | | |
| 5 | 21.940 | 3.800 | 1.79668 | 45.42 |
| 6 | −13.690 | 0.920 | 1.51680 | 64.12 |
| | −125.200 | ($Bf_{ML}$) | | |
| | $Bf_{ML}$ = 27.15 | | | |

A stop S (behind stop) is arranged at a position of 0.720 from the last plane of the main lens ML.

TABLE 7

(Fifth embodiment)
F = 48.60, F number 4.0, $2\omega$ = 46.4°

| No. | Radius of Curvature r | Center Thickness Distance d | Refractive Index n | Abbe Number $\nu$ |
|---|---|---|---|---|
| 1 | −110.940 | 2.260 | 1.64831 | 33.77 |
| 2 | −23.740 | 1.540 | | |
| 3 | −18.890 | 1.030 | 1.77279 | 49.44 |
| 4 | −128.570 | (Bf) | | |

$D_o$ = 1.720, Bf = 29.741, $\beta$ = 1.350
$d_o$ = 25.895, $f_{RCL}$ = −81.52

TABLE 8

(Sixth embodiment)
F = 48.60, F number 4.0, 2ω = 46.6°

| No. | Radius of Curvature r | Center Thickness Distance d | Refractive Index n | Abbe Number ν |
|-----|-----------------------|-----------------------------|--------------------|---------------|
| 1   | −101.460              | 3.100                       | 1.61750            | 30.75         |
| 2   | −22.890               | 1.650                       |                    |               |
| 3   | −18.040               | 1.000                       | 1.84042            | 43.30         |
| 4   | −69.820               | (Bf)                        |                    |               |

$D_o$ = 1.720, Bf = 29.089, β = 1.350
$d_o$ = 25.895, $f_{RCL}$ = −80.78

The values corresponding to the conditional formulas (1)–(8) in the first to sixth embodiments are given below.

TABLE 9

(Values corresponding to conditions)

| Embodi- ment | (1) $\frac{f_1}{|f_{RCL}|}$ | (2) $\frac{r_2}{r_3}$ | (3) $\frac{d_0}{|Bf_{ML}|}$ | (4) $\frac{D}{|f_{RCL}|}$ | (5) $n_2$ | (6) $\frac{d_2}{|f_{RCL}|}$ | (7) $\frac{d_1}{|f_{RCL}|}$ | (8) $\nu_2 - \nu_1$ |
|---|---|---|---|---|---|---|---|---|
| 1 | 0.5634 | 1.258 | 0.8955 | 0.06416 | 1.79668 | 0.02139 | 0.02852 | 14.67 |
| 2 | 0.5771 | 1.273 | 0.8955 | 0.06435 | 1.77279 | 0.02145 | 0.02860 | 13.80 |
| 3 | 0.5593 | 1.318 | 0.8955 | 0.06829 | 1.77279 | 0.02179 | 0.03196 | 15.67 |
| 4 | 0.5976 | 1.314 | 0.9304 | 0.10806 | 1.84042 | 0.02614 | 0.06449 | 12.55 |
| 5 | 0.5657 | 1.257 | 0.9377 | 0.05925 | 1.77279 | 0.01889 | 0.02772 | 15.67 |
| 6 | 0.5838 | 1.269 | 0.9377 | 0.07118 | 1.84042 | 1.02043 | 0203838 | 12.55 |

The RCL in each embodiment has a compact structure and it can be mounted in a still camera or video camera.

Where the RCL of the present invention is mounted, the focusing may be done by driving the main lens ML toward the object, driving the main lens ML and the RCL in union, or driving the RCL alone along the optical axis.

The RCL in each embodiment of the present invention comprises two lenses, positive and negative lenses, although at least one lens unit of the RCL of the present invention may be a bonded lens. Further, at least one lens unit of the RCL of the present invention may be a plastic lens.

The present invention is not limited to the above embodiments but the lenses may be bonded lenses.

I claim:

1. A rear conversion lens to be mounted in rear of a main lens for expanding a resultant focal distance to a longer one than a focal distance of the main lens, comprising:
   a first lens unit having a positive refractive power; and
   a second lens unit having a negative refractive power; said first lens unit and said second lens unit being arranged in this order when viewed from an object; said first lens unit and said second lens unit meeting condition of:

$0.5 < f_1/|f_{RCL}| < 0.6, f_{RCL} < 0$ $1.2 < r_2/r_3 < 1.4$ where $f_{RCL}$ is a focal distance of said rear conversion lens, $f_1$ is a focal distance of said first lens unit, $r_2$ is a radius of curvature of a plane of said first lens unit facing an image, and $r_3$ is a radius of curvature of a plane of said second lens unit facing an object.

2. A rear conversion lens according to claim 1, wherein said first lens unit and said second lens unit further meet the conditions of:

$0.70 < d_o/Bf_{ML} < 0.97, 0.05 < D/|f_{RCL}| < 0.15,$
   $0.018 < d_z/|f_{RCL}| < 0.028,$ $0.025 < d_1/|f_{RCL}| < 0.065,$ $1.73 < n_z, 12 < \nu_z - \nu_1 < 20$ where $Bf_{ML}$ is a back focus of said main lens, D is an on-axis thickness of said rear conversion lens, $d_o$ is a distance from the plane of said rear conversion lens facing the object to the rear focal point of said main lens, $d_1$ is an on-axis thickness of said first lens unit, $d_2$ is an on-axis distance between the plane of said first lens unit facing the image and the plane of said second lens unit facing the object, $n_2$ is a refractive index of said second lens unit, $\nu_1$ is an abbe number of said first lens unit, and $\nu_2$ is an abbe number of said second lens unit.

3. A rear conversion lens according to claim 1, constructed in accordance with the following numerical data:

F = 51.33, F number 5.0, 2ω = 44.8°

| No. | Radius of Curvature r | Center Thickness Distance d | Refractive Index n | Abbe Number ν |
|-----|-----------------------|-----------------------------|--------------------|---------------|
| 1   | −127.320              | 2.000                       | 1.61750            | 30.75         |
| 2   | −20.600               | 1.500                       |                    |               |
| 3   | −16.380               | 1.000                       | 1.79668            | 45.42         |
| 4   | −103.850              | (Bf)                        |                    |               |

$D_o$ = 3.00, Bf = 31.25, β = 1.426
$d_o$ = 25.716, $f_{RCL}$ = −69.93 where 2ω is an image angle, F is a resultant focal distance of the main lens and the rear conversion lens, Bf is a back focus to the image plane, $D_o$ is an air gap between the last plane of the main lens and the first plane of the rear conversion lens, $d_o$ is a distance from the plane of the rear conversion lens facing the object to the rear focal point $O_1$ of the main lens, and β is a magnification of the rear conversion lens.

4. A rear conversion lens according to claim 1, constructed in accordance with the following numerical data:

F = 51.46, F number 5.0, 2ω = 44.8°

| No | Radius of Curvature r | Conter Thickness distance d | Refractive Index n | Abbe Number ν |
|-----|-----------------------|-----------------------------|--------------------|---------------|
| 1   | −120.000              | 2.000                       | 1.62588            | 35.64         |
| 2   | −21.000               | 1.500                       |                    |               |
| 3   | −16.500               | 1.000                       | 1.77279            | 49.44         |
| 4   | −120.000              | (Bf)                        |                    |               |

$D_o$ = 3.00, Bf = 31.25, β = 1.429

-continued

| | F = 51.46, F number 5.0, 2 ω = 44.8° | | | |
|---|---|---|---|---|
| No | Radius of Curvature r | Center Thickness distance d | Refractive Index n | Abbe Number ν |
| | $d_o = 25.716$, $f_{RCL} = -69.93$ | | | | where 2ω is an image angle, F is a resultant focal distance of the main lens and the rear conversion lens, Bf is a back focus to the image plane, $D_o$ is an air gap between the last plane of the main lens and the first plane of the rear conversion lens, $d_o$ is a distance from the plane of the rear conversion lens facing the object to the rear focal point $O_1$ of the main lens, and β is a magnification of the rear conversion lens.

5. A rear conversion lens according to claim 1, constructed in accordance with the following numerical data:

| | F = 51.26, F number 5.0, 2 ω = 44.8° | | | |
|---|---|---|---|---|
| No | Radius of Curvature r | Center Thickness Distance d | Refractive Index n | Abbe Number ν |
| 1 | −214.920 | 2.200 | 1.64831 | 33.77 |
| 2 | −22.450 | 1.500 | | |
| 3 | −17.030 | 1.000 | 1.77279 | 49.44 |
| 4 | −229.340 | (Bf) | | |
| | $D_o = 3.00$, Bf = 30.87, β = 1.424 | | | |
| | $d_o = 25.716$, $f_{RCL} = -68.83$ | | | | where 2ω is an image angle, F is a resultant focal distance of the main lens and the rear conversion lens Bf is a back focus to the image plane, Do is an air gap between the last plane of the main lens and the first plane of the rear conversion lends, $d_o$ is a distance from the plane of the rear conversion lens facing the object to the rear focal point $O_1$ of the main lens, and β is a magnification of the rear conversion lens.

6. A rear conversion lens according to claim 1, constructed in accordance with the following numerical data:

| | F = 55.00, F number 5.3, 2 ω = 41.8° | | | |
|---|---|---|---|---|
| No | Radius of Curvature r | Center Thickness Distance d | Refractive Index n | Abbe Number ν |
| 1 | 250.000 | 3.700 | 1.61750 | 30.75 |
| 2 | −23.000 | 1.500 | | |
| 3 | −17.500 | 1.000 | 1.84042 | 43.30 |
| 4 | 855.000 | (Bf) | | |
| | $D_o = 2.00$, Bf = 32.59, β = 1.528 | | | |
| | $d_o = 26.716$, $f_{RCL} = -57.38$ | | | | where 2ω is an image angle, F is a resultant focal distance of the main lens and the rear conversion lens, Bf is a back focus to the image plane D, is an air gap between the last plane of the main lens, $d_o$ is a distance from the plane of the rear conversion lens facing the object to the rear focal point $O_1$ of the main lens, and β is a magnification of the rear conversion lens.

7. A rear conversion lens according to claim 1, constructed in accordance with the following numerical data:

| | F = 48.60, F number 4.0, 2 ω = 46.4° | | | |
|---|---|---|---|---|
| No | Radius of Curvature r | Center Thickness Distance d | Refractive Index n | Abbe number ν |
| 1 | −110.940 | 2.260 | 1.64831 | 33.77 |
| 2 | −23.740 | 1.540 | | |
| 3 | −18.890 | 1.030 | 1.77279 | 49.44 |
| 4 | −128.570 | (Bf) | | |
| | $D_o = 1.720$, Bf = 29.741, β = 1.350 | | | |
| | $d_o = 25.895$, $f_{RCL} = -81.52$ | | | | where 2ω is an image angle, F is a resultant focal distance of the main lens and the rear conversion lens, Bf is a back focus to the image plane, $D_o$ is an air gap between the last plane of the main lens and the first plane of the rear conversion lens, $d_o$ is a distance from the plane of the rear conversion lens facing the object to the rear focal point $O_1$ of the main lens, and β is a magnification of the rear conversion lens.

8. A rear conversion lens according to claim 1, constructed in accordance with the following numerical data:

| | F = 48.60, F number 4.0, 2 ω = 46.6° | | | |
|---|---|---|---|---|
| No | Radius of Curvature r | Center Thickness Distance d | Refractive Index n | Abbe Number ν |
| 1 | −101.460 | 3.100 | 1.61750 | 30.75 |
| 2 | −22.890 | 1.650 | | |
| 3 | −18.040 | 1.000 | 1.84042 | 43.30 |
| 4 | −69.820 | (Bf) | | |
| | $D_o = 1.720$, Bf = 29.089, β = 1.350 | | | |
| | $d_o = 25.895$, $f_{RCL} = -80.78$ | | | | where 2ω is an image angle, F is a resultant focal distance of the main lens and the rear conversion lens, Bf is a back focus to the image plane, $D_o$ is an air gap between the last plane of the main lens and the first plane of the rear conversion lens, $d_o$ is a distance from the plane of the rear conversion lens facing the object to the rear focal point $O_1$ of the main lens, and β is a magnification of the rear conversion lens.

* * * * *